US012717544B2

(12) United States Patent
Kishimoto et al.

(10) Patent No.: US 12,717,544 B2
(45) Date of Patent: Aug. 25, 2026

(54) COMPUTING DEVICE, RECOGNITION DEVICE, AND CONTROL DEVICE

(71) Applicant: Hitachi Astemo, Ltd., Hitachinaka (JP)

(72) Inventors: Tadashi Kishimoto, Tokyo (JP); Goichi Ono, Tokyo (JP); Akira Kitayama, Tokyo (JP); Hiroaki Ito, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 1094 days.

(21) Appl. No.: 17/789,730

(22) PCT Filed: Oct. 30, 2020

(86) PCT No.: PCT/JP2020/040917
§ 371 (c)(1),
(2) Date: Jun. 28, 2022

(87) PCT Pub. No.: WO2021/140730
PCT Pub. Date: Jul. 15, 2021

(65) Prior Publication Data

US 2023/0067212 A1 Mar. 2, 2023

(30) Foreign Application Priority Data

Jan. 9, 2020 (JP) ................................ 2020-002022

(51) Int. Cl.
*G06F 7/499* (2006.01)
*G06F 17/15* (2006.01)

(52) U.S. Cl.
CPC .............. *G06F 7/499* (2013.01); *G06F 17/15* (2013.01)

(58) Field of Classification Search
CPC ................................ G06F 7/499; G06F 17/15
See application file for complete search history.

(56) References Cited

U.S. PATENT DOCUMENTS

2007/0266072 A1* 11/2007 Comea-Hasegan .......................... G06F 7/4915 708/623
2019/0095175 A1 3/2019 Yamanaka et al.
2021/0141601 A1 5/2021 Takayama et al.

FOREIGN PATENT DOCUMENTS

JP H11-161472 A 6/1999
JP 2014-002588 A 1/2014
(Continued)

OTHER PUBLICATIONS

Wei Liu, et al. "SSD : Single Shot MultiBox Detector"Proc. of European Conference on Computer Vision (ECCV), pp. 21-37, Sep. 2016. 17 pages.

(Continued)

*Primary Examiner* — Michael D. Yaary
(74) *Attorney, Agent, or Firm* — Volpe Koenig

(57) ABSTRACT

The present invention aims to reduce power consumption in the operation based upon a recognition device (1000) including, in a neural network of multiple layers that output type of an object and existing coordinates based on external environment information, a selector (103) that selects input data to convolution operation units (107-1 to L) from external environment information; convolution operation units (107-1 to L) configured by a plurality of layers connected in cascade; and a parameter storage unit (109) that stores a weight parameter of each layer, a cumulative addition count of each layer, and an omitting bit number of each layer. The recognition device includes operation stop signal generation units (116-1 to L) that transmit one or more stop signals for stopping some or all of the computing units of the convolution operation units (107-1 to L) to the convolution operation units (107-1 to L) for each layer.

12 Claims, 6 Drawing Sheets

(56) References Cited

FOREIGN PATENT DOCUMENTS

| | | | |
|---|---|---|---|
| JP | 2019-057249 | A | 4/2019 |
| WO | 2018154648 | A1 | 8/2018 |

OTHER PUBLICATIONS

Glorot, et al. "Deep sparse rectifier neural networks" Proc. of the 14th International Conference on Artificial Intelligence and Statistics (AISTATS), pp. 315-323, Apr. 2011. 10 pages.

International Search Report for Application No. PCT/JP2020/040917, dated Jan. 26, 2021. 3 pages.

* cited by examiner

EXAMPLE OF bi = 19, bo = 8, c = 5

COMPUTING DEVICE, RECOGNITION DEVICE, AND CONTROL DEVICE

TECHNICAL FIELD

The present invention relates to a computing device that executes operation based on input data and a computing method thereof. The present invention also relates to a recognition device that recognizes input data and a control device that performs control according to the input data using the computing device.

BACKGROUND ART

In recent years, computing devices based on input data are being used in various forms. It is used for financial transactions using artificial intelligence (AI), production management in agriculture or industry, control on an object, and the like.

As an example thereof, it is also used in a recognition device that collects external environment information using a camera, light detection and ranging (LIDAR), or the like, and detects a type of an object and existing coordinates from the information, and a control device that uses the recognition device. As applications thereof, applications to vehicle control have also been made.

In recent years, traffic accidents have become a social problem, and demands for safety during movement by vehicles are increasing. In order to meet the demand, various technologies for automatic driving and driving support have been proposed. Among them, in particular, an object recognition method and a behavior prediction method using a convolutional neural network (CNN), which is one of deep neural networks (DNNs), are known to have high recognition performance. Furthermore, application of the CNN to automatic driving is progressing.

For example, the CNN described in NPL 1 is a neural network configured by a plurality of convolution layers with image data, which is external environment information, as an input, and connected in cascade. Here, the convolution layer is configured by a product-sum operation and an activation function operation, and is a series of operations of performing multiplication of a pixel in input data and a corresponding weight parameter, creating output data by cumulatively adding the result of the multiplication for a certain number of times, then performing an activation function operation, and outputting the result. By performing the operation of the convolution layer on the image data, the type of a specific object and the existing coordinates in the input image data are output.

Here, a general configuration for performing such processing will be described. A first layer constituting the CNN outputs a convolution operation result by performing a product-sum operation of the input image data and the weight parameter of the convolution operation of the first layer. A j-th convolution layer of the plurality of neural networks is referred to as a j-th layer, and the j-th layer (integer satisfying $1 \leq j \leq L$) outputs an operation result of the convolution layer of the j-th layer from the output data of the (j−1)th layer and a weight parameter of a convolution operation of the j-th layer. Assuming that the final layer is the L-th layer, the output data of the (L−1)th layer preceding the L-th layer and the weight parameter of the convolution operation of the L-th layer are used as inputs, and the type of the object and the existing coordinates are output.

Then, the respective convolution layer performs a convolution operation using the input data and the weight parameter, and thereafter, an activation function operation, and outputs a result. The activation function operation is an operation of replacing all negative data in the convolution operation result with 0 by a ReLU function (ramp function) which is one of the activation functions. NPL 2 is proposed as an example of this operation.

However, in a case where processing having a large amount of operations mainly including the product-sum operation such as DNN is implemented on an in-vehicle electronic control unit (ECU) having a limited power usage amount, it is necessary to reduce power consumption. Conventionally, in a case where the DNN is implemented on an in-vehicle ECU having a large power limit, an integer operation of computing data with a low bit length has been performed for the purpose of reducing power, as in the method described in PTL 1. This low-bit integer computing method includes computing an operation inside the DNN with a certain bit length and further transfer to the next stage.

However, when this multiplication and addition are performed with an ideal operation, there is a problem that the bit length necessary for expressing data increases every time the operation is performed. Therefore, in order to perform the operation after the product-sum operation with a bit length equivalent to that before the product-sum operation, a rounding process of reducing the increased bit length is generally performed. When this rounding process is performed, a bit length necessary for expressing data is reduced, so that the expressible range of the data after the rounding process is limited, and a minute value is rounded to 0.

Furthermore, a case where the CNN is implemented in hardware as an external environment recognition device will be described. The input from the outside is acquired using an external environment information acquisition device such as a camera or a LIDAR, and is converted into a bitmap. The bitmapped information is stored in a memory. The external environment recognition device is configured by a memory, a selector, a learning data storage unit, a parameter storage unit, a plurality of convolution operation units, and a learning data storage unit, and outputs a recognition result such as a type of an object and existing coordinates.

The bitmap stored in the memory is extracted as a size to be used by the post-stage convolution operation unit by the selector, divided for every necessary input data, and transmitted to the convolution operation unit. In addition, the learning data storage unit stores data learned in advance, and saves the learned data in the parameter storage unit. The parameter storage unit selects the weight parameter for each layer, the cumulative addition count for each layer, and the omitting bit number for each layer from the received learned data, and transmits the selected data to the convolution operation units from the first layer to the L-th layer. In the convolution operation unit, the first layer outputs, with the input data from the selector, the weight parameter of the first layer, the cumulative addition count of the first layer, and the omitting bit number of the first layer as inputs, operation result to the second layer. The convolution units are cascade connected, where in the convolution operation unit of the j-th layer, which is the j-th layer, the output of the convolution operation unit of the (j−1)th layer, the weight parameter of the j-th layer, the cumulative addition count, and the omitting bit number are inputs, and the operation result is output to the (j+1)th layer.

The convolution operation unit performs a convolution operation based on the input data transmitted from the selector, the weight parameter transmitted from the parameter storage unit, and the cumulative addition count. Then, a rounding process is performed on the operation result based on the omitting bit number transmitted from the parameter storage unit, an activation function operation is performed on the result of the rounding process, and the operation result is output to the next layer.

In addition, in a computing device, an operation amount is generally reduced. As an example, PTL 1 will be described. The stage operation unit of PTL 1 receives input data from the operation storage unit and a stop signal from a stop determination unit. The operation value storage unit receives input data from the outside, an output of the stage operation unit, and a stop signal from the stop determination unit. An operation result from the stage operation unit is input to a maximum digit detection unit.

Furthermore, PTL 1 is executed by the following operation. First, the stage operation unit performs FFT operation including a so-called butterfly operation on the data input from the operation storage unit. Thereafter, the stop determination unit determines whether or not the operation can be stopped based on the output data of the stage operation unit for each stage. The stop determination unit compares the estimated maximum value of when the future stage operation is performed to the end with the minimum value information input from the outside from the operation result and the number of remaining stages. As a result, a technique is disclosed in which, when the estimated maximum value is smaller than the minimum value information, a stop signal is transmitted to the stage operation unit and the operation storage unit, and the subsequent stage operation is stopped, thereby executing a desired FFT operation without lowering accuracy.

Furthermore, in PTL 2, unnecessary operation is stopped in a computing device that performs fast Fourier transform (FFT) operation. Specifically, with input data from the outside and minimum value information as inputs, a stop determination unit is used to determine whether to stop.

CITATION LIST

Non-Patent Literature

NPL 1 Wei Liu, et al. "SSD: Single Shot MultiBox Detector" Proc. of European Conference on Computer Vision (ECCV), pp. 21-37, September 2016.

NPL 2 X. Glorot, et al. "Deep sparse rectifier neural networks" Proc. of the 14th International Conference on Artificial Intelligence and Statistics (AISTATS), pp. 315-323, April 2011.

Patent Literature

PTL 1 JP 2019-57249 A

PTL 2 JP 2014-2588 A

SUMMARY OF INVENTION

Technical Problem

Here, the rounding process of the CNN described above is the process of omitting the high order and the low order in a long bit length. Here, it is known that the CNN has sparsity in which the output result has many 0, and the sparsity is different for each layer. In an operation result in which an operation result is expressed by a binary bit string by the rounding process in the convolution operation, a great number of digits that become 0 exist in the bit string. According to such rounding process, data in which a part or all of the output result can be rounded to 0 or data in which a part or all of the value input to the product-sum operation is 0 is multiplied by 0 or added to 0. Therefore, it has been found that there is no effect on accuracy even if operation is not actually performed. However, in the conventional computing unit configuration, a large number of devices for determining the presence or absence of 0 need to be installed due to the many number of parallels, and it is not easy to frequently stop the operation for each layer. As a result, there is a problem that operation that does not contribute to accuracy, such as multiplication by 0, is performed, and wasteful power is consumed.

Here, PTL 1 and PTL 2 that perform unnecessary operation related to the above problem will be considered. PTL 1 has a configuration in which determination is made on the stage operation output of the FFT to determine whether or not the subsequent stage operation can be executed.

In addition, in PTL 2, butterfly operation is performed based on a plurality of pieces of input data, and FFT operation is performed by mutually using all the input data.

Therefore, in the methods of PTLs 1 and 2, a mechanism for independently stopping the operation in the FFT cannot be provided, and the operation can be stopped only in units of FFT operation.

That is, in the configurations in PTLs 1 and 2 in which the determination is performed on the individual computing units in the product-sum operation, there is a problem that the load of the stop control on a large number of computing units in the CNN is large. Specifically, in PTLs 1 and 2, since it is necessary to provide a determination unit for each of a large number of computing units to determine the stop of operation, the circuit scale for the operation stop determination greatly increases, which is not practical.

Therefore, an object of the present invention is to reduce or suppress the power consumption amount by stopping the operation on the layer of the neural network while suppressing the circuit scale.

Solution to Problem

In order to solve the above problem, according to the present invention, a computing device that performs a predetermined operation includes: a numerical value operation unit including a first computing unit that performs a predetermined operation based on input data and a second computing unit that performs a predetermined operation using an operation result from the first computing unit; a rounding operation unit that performs a rounding operation on an output of the numerical value operation unit; a parameter storage unit that stores number of bits omitted by the rounding operation in the rounding operation unit; and an operation stop signal generation unit that determines whether operations on the first computing unit and the second computing unit need to be stopped, based on the input data and the number of bits, and outputs a stop signal according to a result of the determination. The present invention also includes a recognition device and a control device using the computing device. Furthermore, a method using each of the computing device, the recognition device, and the control device is also an aspect of the present invention.

Advantageous Effects of Invention

According to the present invention, the power consumption amount can be reduced by controlling the stop of the computing device.

DESCRIPTION OF EMBODIMENTS

Hereinafter, the idea common to the respective examples will be described before describing the first and second examples. The CNN has a feature in that the sparsity is different for each layer. In addition, different parameters are input for each layer.

However, due to the feature that the same data is input to a plurality of computing units in the operation of the same layer, the inventors of the present application focused on the fact that the determination unit can be aggregated and the individual computing unit can be stopped independently by independently providing the operation stop signal in each layer. That is, in each example, the rounding operation is performed, and the stop of operation is determined based on the relationship between the preceding stage and the subsequent stage of the computing unit. This would “pull” the value by a rounding operation. As for the “pulled” value, the value for which operation becomes unnecessary (e.g., the value is 0) increases. That is, this is because, depending on the rounding process, it is not necessary to perform operation in the computing unit at the preceding stage and the computing unit at the subsequent stage. The first and second examples using this idea will be described below.

First Example

Figure 1:
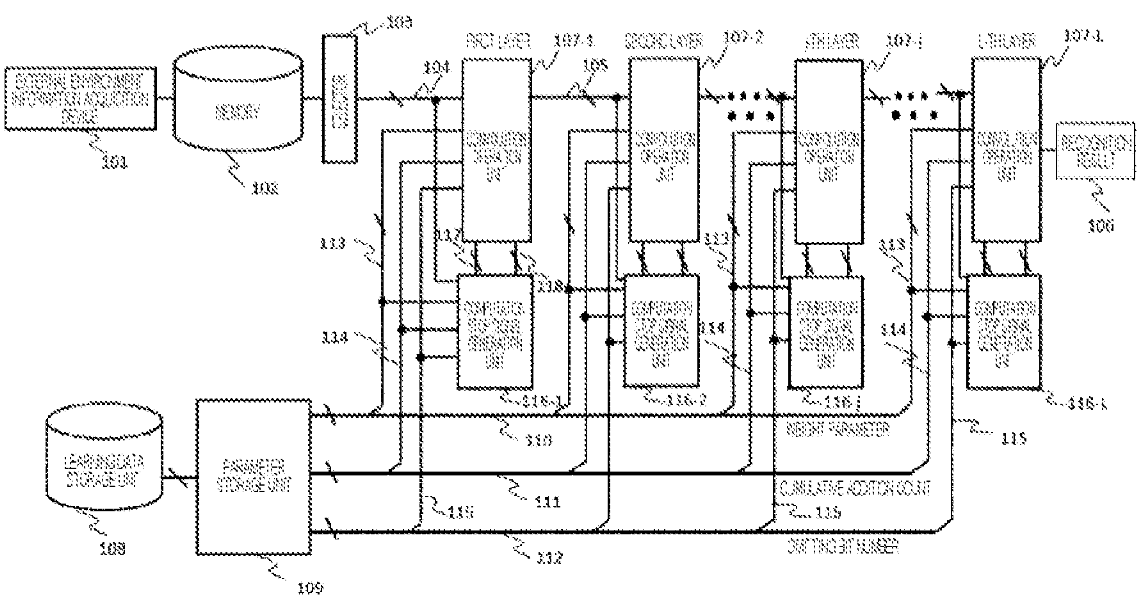
FIG. 1 is a configuration diagram of a recognition device 1000 according to a first example.

FIG. 1 is a configuration diagram of a recognition device 1000 for external environment information from an external environment information acquisition device such as a camera or LIDAR according to a first example. According to the recognition device 1000, the situation of the external environment can be recognized, and control such as automatic driving and driving support can be performed using the result. Note that, in the present example, the recognition device 1000 will be described as an example, but a computing device that performs operation not limited to recognition is also included in the scope of the present example.

The recognition device 1000 of the external environment information of FIG. 1 is configured by an external environment information acquisition device 101, a memory 102, a selector 103, a learning data storage unit 108, a parameter storage unit 109, a convolution operation unit 107 of each layer, and an operation stop signal generation unit 116 of each layer, and outputs the recognition result 106. Note that, in the recognition device 1000, at least a part of the external environment information acquisition device 101, the memory 102, the selector 103, the learning data storage unit 108, and the parameter storage unit 109 may not be provided in the recognition device 1000. These may be provided outside the recognition device 1000 and connected to the recognition device 1000. The same applies to a second example described later.

Next, a connection relationship of the recognition device 1000 illustrated in FIG. 1 will be described. The external environment information acquisition device 101 transmits a bitmap of external information such as the detected image to the memory 102. The parameter storage unit 109 receives an output from the learning data storage unit 108.

In the convolution operation unit 107, the first layer to the L-th layer are connected in cascade. Then, the following information is input to the convolution operation unit 107-1 of the first layer. The information are the output data of the selector 103 (the input data 104 of the convolution operation unit 107), the weight parameter 113 of the own layer which is the output of the parameter storage unit 109, the cumulative addition count 114, the omitting bit number 115, and the first stop signal 117 and the second stop signal 118 which are the outputs of the operation stop signal generation unit 116.

Furthermore, the following information is input to the convolution operation unit 107*j* corresponding to the j-th layer. The information are the convolution operation output 105 of the convolution operation unit 107*j*−1 of the (j−1)th layer which is the previous layer, the weight parameter 113, the cumulative addition count 114, the omitting bit number 115, the first stop signal 117, and the second stop signal 118.

Furthermore, the following information is input to the convolution operation unit 107-L of the final layer (L-th layer). The information are the convolution operation output 105 of the convolution operation layer of the (L−1)th layer, the weight parameter 113, the cumulative addition count 114, the omitting bit number 115, the first stop signal 117, and the second stop signal 118. Then, the convolution operation unit 107-L outputs the recognition result 106.

The weight parameter 113, the cumulative addition count 114 of the own layer, and the omitting bit number 115 of the own layer are input to the operation stop signal generation unit 116.

Next, an operation and a signal flow of the recognition device of FIG. 1 will be described. That is, an external environment recognition operation by the recognition device will be described.

The recognition device 1000 stores the external environment information acquired from the external environment information acquisition device 101 in the memory 102 as a bitmap. Thereafter, the selector 103 selects data to use for operation from the bitmap stored in the memory 102 as the input data 104, and sequentially transmits the input data to the convolution operation unit 107.

Each convolution operation unit 107(1 to L) receives the weight parameter 113, the cumulative addition count 114, and the omitting bit number 115 of the own layer from the parameter storage unit 109. Then, the convolution operation unit 107 performs the operation based on these, and transmits the convolution operation output 105 to the convolution operation unit of the next layer. This is repeated from the first layer to the L-th layer, and in the L-th layer, a recognition result 106 that is the type and coordinates of the object is output. In this manner, recognition on the external environment using the recognition device 1000 is executed.

Here, in the above recognition, the stop of operation when achieving the efficiency of the operation such as the power consumption reduction will be described. Specifically, operations of the operation stop signal generation units 116-1 to L will be described with reference to FIG. 6.

Next, an internal configuration of each convolution operation unit 107 in the recognition device 1000 of FIG. 1 will be described with reference to FIG. 2. Here, in the present example, a configuration is illustrated in which each convolution operation unit 107 includes a first operation unit 801 and a second operation unit 802 configured by a plurality of computing units, and each computing unit is connected in parallel in each of the first operation unit 801 and the second operation unit 802. Specifically, an example in which the computing unit (1)301 is 4 in parallel and the computing units (2)401 is 2 in parallel is shown. Note that the present example is for simplification of the description, and the number thereof is not limited.

First, the configuration of FIG. 2 will be described.

Figure 2:
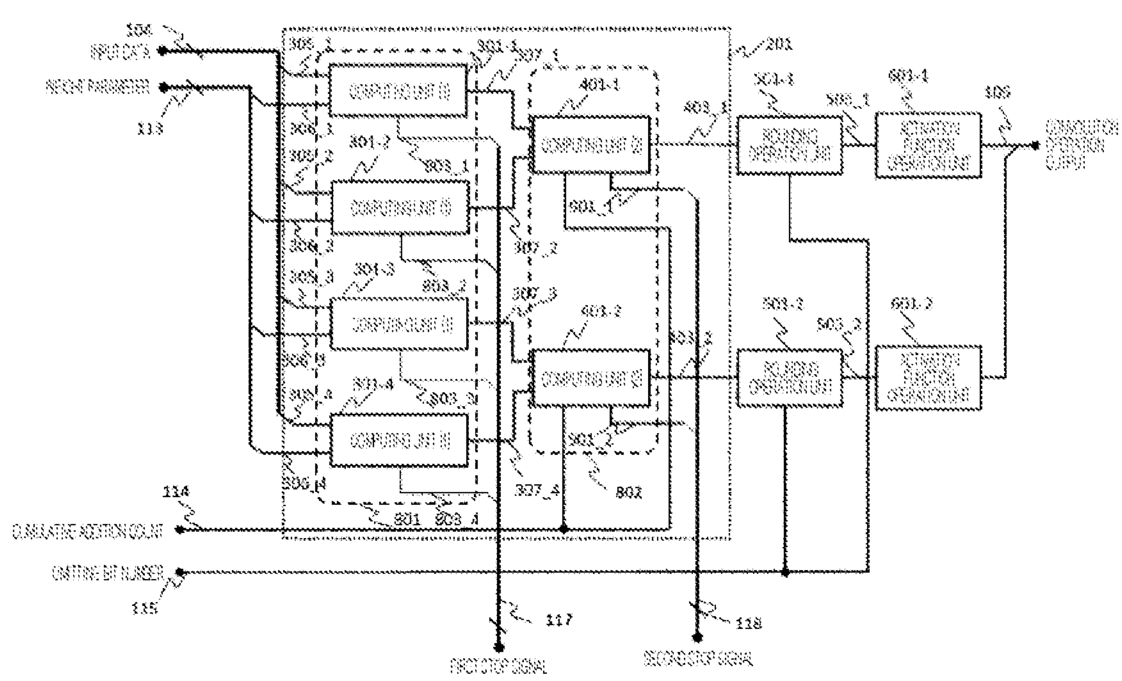
FIG. 2 is a diagram illustrating an internal configuration of a convolution operation unit 107 in the first example.

Each convolution operation unit 107 includes four computing units (1)301-1 to 4 and two computing units (2)401-1 to 2, each of which constitutes a first operation unit 801 and a second operation unit 802 (broken line portion in FIG. 2). Here, the computing units (1)301-1 to 2 are referred to as a first operation unit 801, and the computing units (2)401-1 to 2 are referred to as a second operation unit 802. The first stop signal 117 is input to the first operation unit 801, and the second stop signal is input to the second operation unit 802. In addition, each convolution operation unit 107 includes two rounding operation units 501-1 and 2 and two activation function operation units 601-1 and 2. Note that the first operation unit 801 may be referred to as a preceding stage, and the second operation unit 802 may be referred to as a subsequent stage.

Each convolution operation unit 107 receives the input data 104, the weight parameter 113, the cumulative addition count 114, the omitting bit number 115, the first stop signal 117, and the second stop signal 118, and outputs the convolution operation output 105.

Next, a connection relationship of FIG. 2 will be described.

Each computing unit (1)301 receives the individual input data 305_1 to 4 branched from the input data 104, the individual weight parameter 306_1 to 4 branched from the weight parameter 113, and the stop signal 803_1 to 4 to the computing unit (1)301 branched from the first stop signal 117.

The computing unit (2)401-1 receives the output 307_1 of the computing unit (1)301-1, the output 307_2 of the computing unit (1)301-2, the stop signal 901_1 to the computing unit (2)401-1 branched from the second stop signal 118, and the cumulative addition count 114. The computing unit (2)401-2 receives the output 307_3 of the computing unit (1)301-3, the output 307_4 of the computing unit (1)301-4, the stop signal 901_2 to the computing unit (2)401-2 branched from the second stop signal 118, and the cumulative addition count 114.

The rounding operation unit 501-1 receives the output 403_1 of the computing unit (2)401-1 and the omitting bit number 115. Similarly, the rounding operation unit 501-2 receives the output 403_2 of the computing unit (2)401-2 and the omitting bit number 115.

The activation function operation unit 601-1 receives the output 503_1 of the rounding operation unit 501-1 as an input, and outputs the first convolution operation output of the convolution operation unit 107-1. The activation function operation unit 601-2 receives the output 503_2 of the rounding operation unit 501-2 as an input, and outputs the first convolution operation output. Here, the first and second convolution operation outputs are composited to become a convolution operation output 105 of the convolution operation unit 107. Note that, in the present composite, components (not illustrated) may be used, or the respective signal lines may be simply connected and composited.

Next, an operation of the convolution operation unit 107 will be described.

Each convolution operation unit 107 performs a convolution operation based on the input data 104 and the weight parameter 113, and outputs a convolution operation output 105 thereof. Each computing unit (1)301 in the convolution operation unit 107 multiplies the input data 104 by the weight parameter 113.

Each computing unit (2)401 cumulatively adds the outputs 307 from each computing unit (1)301. Details of the computing unit (2)401 will be described later with reference to FIG. 3.

Next, each rounding operation unit 501 omits the high order and the lower order bits based on the omitting bit number 115 from the output 403 of the computing unit 2(401), and cuts out and outputs a specific number of bits. Details of the rounding operation unit 501 will be described later with reference to FIGS. 4 and 5.

Each activation function operation unit 601 performs an activation function operation based on the output 503 of the rounding operation unit 501 and outputs the result. In the present example, an example in which each activation function operation unit 601 performs the ReLU operation on the input data and outputs the convolution operation output 105 will be described.

When the first stop signal 117 becomes effective, the first operation unit 801 independently stops the corresponding ones of the computing units (1)301-1 to 4 of the first operation unit 801. When the second stop signal 118 becomes effective, the second operation unit 802 independently stops the corresponding ones of the computing units (2)4011 to 2 of the second operation unit 802.

Figure 3:
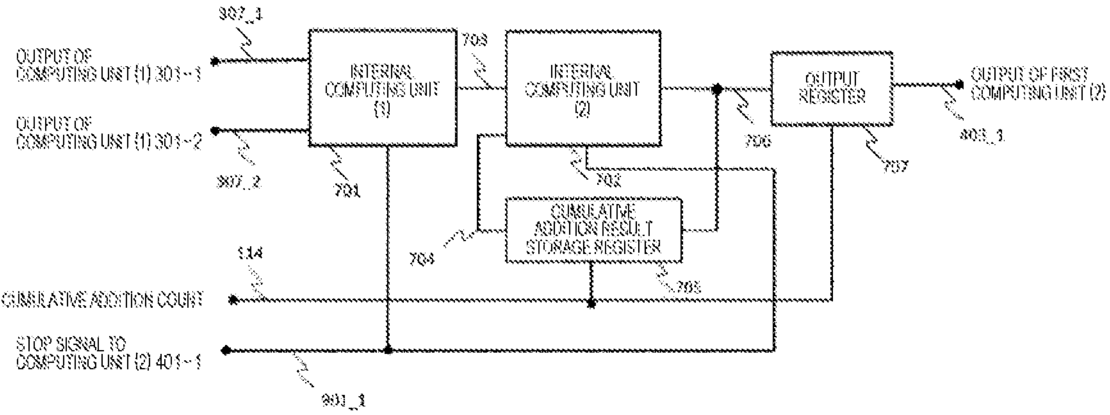
FIG. 3 is a diagram illustrating an internal configuration of a computing unit (2)401 in the first example.

Next, the computing unit (2)401 will be described with reference to FIG. 3. First, an internal configuration of the computing unit (2)401 will be described. Note that, in FIG. 3, the computing unit (2)401-1 is illustrated as an example, but the computing unit (2)401-2 also has a similar configuration.

The computing unit (2)401-1 is configured by an internal computing unit (1)701, an internal computing unit (2)702, a cumulative addition result storage register 705, and an output register 707. The computing unit (2)401-1 receives the output 307_1 of the computing unit (1)301-1, the output 307_2 of the computing unit (1)301-2, the cumulative addition count 114, and the stop signal 901_1 of the computing unit (2)401-1 as the input. Then, an output 403_1 is output from the respective output register 707.

Next, a connection relationship of each configuration indicated by the computing unit (2)401 will be described with reference to FIG. 3.

An output 307_1 of the computing unit (1)301-1 and an output 307_2 of the computing unit (1)301-2 are input to the internal computing unit (1)701. An output 704 which is a cumulative addition result in the cumulative addition result storage register 705 and an output 703 of the internal computing unit (1)701 are input to the internal computing unit (2)702. The cumulative addition count 114 and the output 706 of the internal computing unit (2)702 are input to the cumulative addition result storage register 705. In the output register 707, the output 706 of the internal computing unit (2)702 and the cumulative addition count 114 are input, and an output 403_1 is output as an output of the computing unit (2)401-1 illustrated in FIG. 3.

Next, the operation of each configuration illustrated in FIG. 3 will be described.

The internal computing unit (1)701 and the internal computing unit (2)702 each serve as an adder. The internal computing unit (1)701 adds the output 307_1 of the computing unit (1)301-1 and the output 307_2 of the computing unit (1)301-2, and outputs an output 703, which is the result of addition, to the internal computing unit (2)702. The internal computing unit (2)702 adds the output 703 and the output 704 of the cumulative addition result storage register 705, and outputs an output 706, which is the result of addition, to the cumulative addition result storage register 705 and the output register 707.

The cumulative addition result storage register 705 stores the output 706 from the internal computing unit (2)702. At that time, the cumulative addition result storage register 705 counts the number of operations of the internal computing unit (2)702, and resets the value in the cumulative addition result storage register 705 when the number of operations reaches the cumulative addition count 114. The output register 707 receives the output 706 of the internal computing unit (2)702 as the input, and when the number of operations reaches the cumulative addition count 114, outputs an output 706, which is internal data, as the output 403 of the computing unit (2)401.

Figure 4:
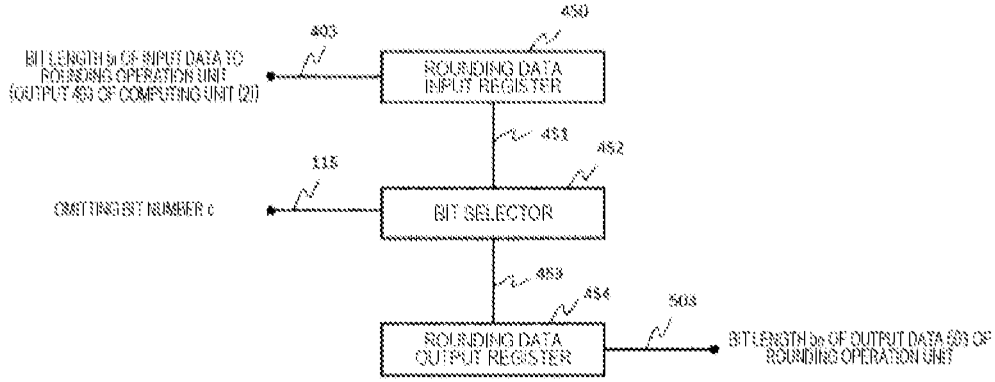
FIG. 4 is a diagram illustrating an internal configuration of a rounding operation unit 501 in the first example.

Next, the rounding operation unit 501 will be described with reference to FIG. 4. First, an internal configuration of the rounding operation unit 501 will be described.

Each rounding operation unit 501 includes a rounding data input register 450, a bit selector 452, and a rounding data output register 454. Furthermore, the rounding operation unit 501 receives the output 403 of the computing unit (2)401 and the omitting bit number 115 as the input, and output the output 503 of after the rounding process.

Next, a connection relationship of the internal configuration of the rounding operation unit 501 will be described with reference to FIG. 3.

The output 403 is input to the rounding data input register 450 as input data. The omitting bit number 115 and the output 451 of rounding data input register 450 are input to the bit selector 452. The rounding data output register 454 receives a bit selector output 453, which is an output of the bit selector, as input, and outputs an output 503.

Next, an operation of the rounding operation unit 501 will be described.

The output 403 (input data) is stored in the rounding data input register 450. Next, the bit selector 452 extracts a specific bit string from the data in the rounding data input register 450 based on the omitting bit number 115, and stores the extracted bit string in the rounding data output register 454. Then, the output 503 of the rounding data output register 454 becomes an output of the rounding operation unit 501. Details of the operation will be described below with reference to FIG. 5.

Figure 5:
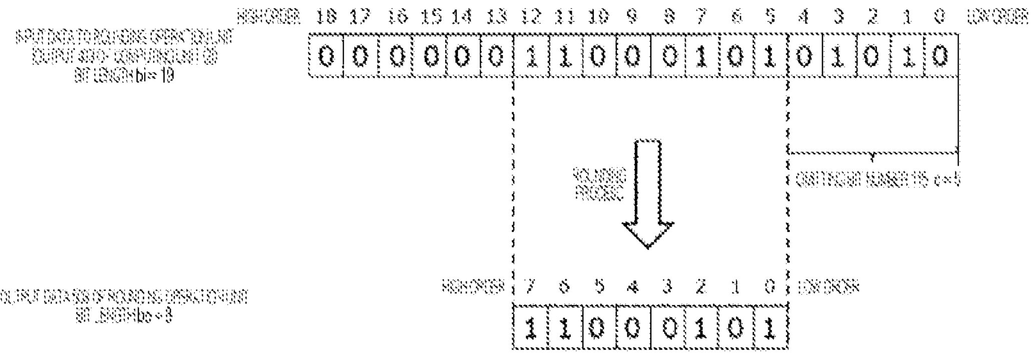
FIG. 5 is a diagram showing a processing flow of the rounding operation unit 501 in the first example.

FIG. 5 illustrates a process when a bit length bo (bo=8 in the example) of the output 403 after the rounding operation is extracted from a bit length bi (bi 19 in the example) of the output 503 (input data). A bit string (described in a rectangle) in the upper stage of FIG. 5 indicates a bit string in which the output 403 (input data) is displayed in binary, and a bit string (described in a rectangle) in the lower stage of FIG. 5 indicates a bit string in which the output 503 is displayed in binary.

Here, the numerical value at the upper top of the rectangle indicates the bit position counted from the bottom. The upper stage illustrates an example of the bit positions 0 to 18, and the lower stage illustrates an example of the bit positions 0 to 7. Arrows in FIG. 5 indicate the cutout operations before and after the rounding process. Here, an example is illustrated in which the bit position (5 to 12) of the output 403 (input data) is assigned to the bit position (0 to 7) of the output 503. The omitting bit number 115 indicates an example of 5 bits. In the rounding process at this time, output 403 (input data) worth 8 bits corresponding to bo=8 is cut out from a bit position shifted from a low order side of the output 403 (input data) to a 5 bit high order side based on a value c=5 of the omitting bit number 115, and output as the output 503.

Next, a case where the number of computing unit (1)301 and the computing unit (2)401 of the convolution operation unit 107 is extended from the example of 4×2 (FIG. 2) so that n×m inputs are possible will be described with reference to FIG. 6. Here, a difference between FIG. 6 and FIG. 2 will be described.

Figure 6:
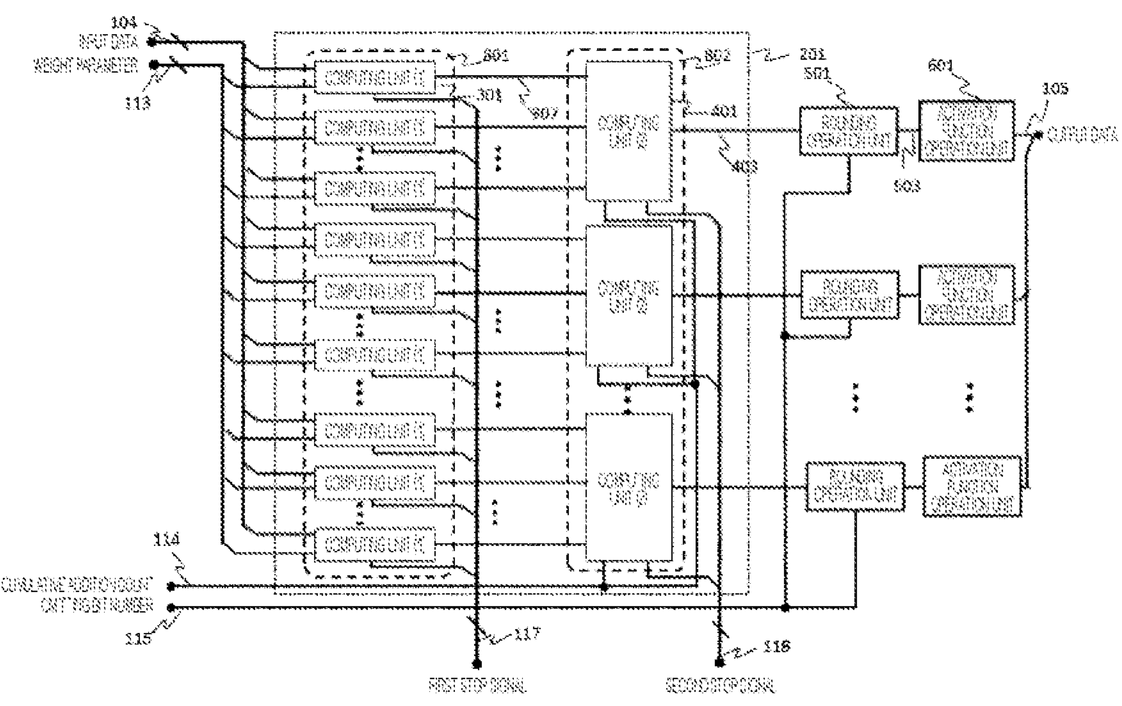
FIG. 6 is a diagram illustrating an example in which the input of the convolution operation unit 107 is expanded to n×m in the first example.

In FIG. 6, the convolution operation unit 107 is a bus wiring having the input data 104 and the weight parameter 113 has n×m types of data. The first stop signal 117 is a bus wiring having n×m signals, and the second stop signal 118 is a bus wiring having m signals. That is, the number of computing units (1)301 is n×m, the number of computing units (2)401 is m, the number of rounding operation units 501 is m, and the number of activation function operation units 601 is m.

The connection relationship in FIG. 6 will be described below. The basic connection relationship is the same as the connection relationship described with reference to FIG. 2, and the numbers of computing units (1)301, computing units (2)401, rounding operation units 501, and activation function operation units 601 are different. As described above, in the convolution operation unit 107 of the present example, the number of each component constituting the convolution operation unit is not limited.

Figure 7:
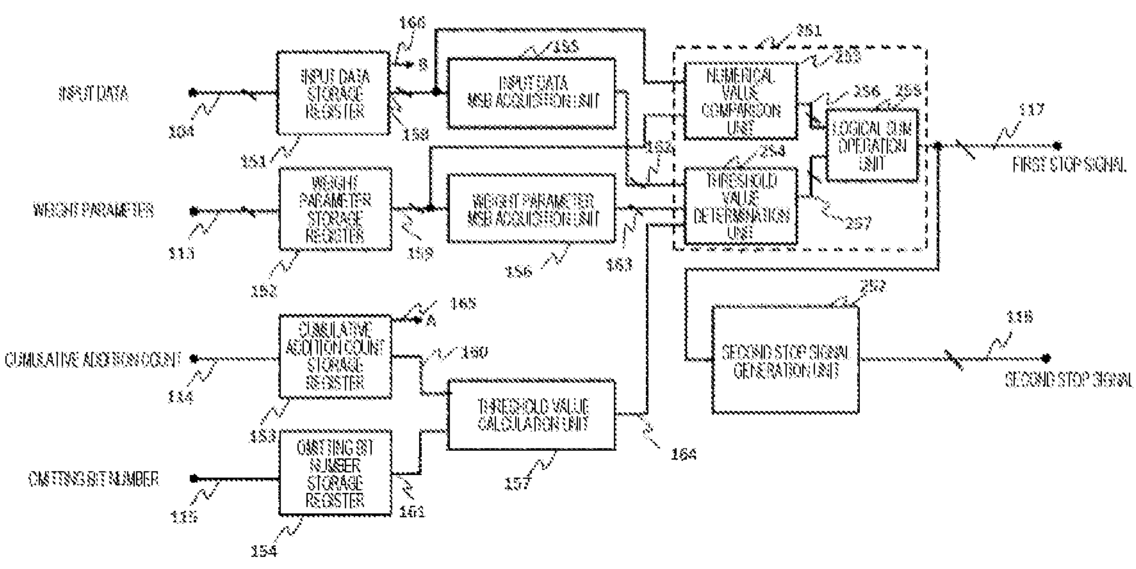
FIG. 7 is a diagram illustrating an internal configuration of a stop signal generation unit 116 in the first example.

Specifically, the operation stop signal generation unit 116 will be described with reference to FIG. 7. FIG. 7 illustrates an internal configuration of the operation stop signal generation unit 116.

The operation stop signal generation unit 116 includes the following components.

The input data storage register 151

The weight parameter storage register 152

The cumulative addition count storage register 153

The omitting bit number storage register 154

The input data most significant bit (MSB) acquisition unit 155

The weight parameter MSB acquisition unit 156

The threshold value calculation unit 157

The first stop signal generation unit 251

The second stop signal generation unit 252

The operation stop signal generation unit 116 receives the input data 104, the weight parameter 113, the cumulative addition count 114, and the omitting bit number 115 as inputs, and outputs the first stop signal 117 and the second stop signal 118. The MSB indicates the most significant bit of the valid data in the input data.

Next, a connection relationship of the operation stop signal generation unit 116 will be described with reference to FIG. 7.

The input data 104 is input to the input data storage register 151. The weight parameter 113 is input to the weight parameter storage register 152. The cumulative addition count 114 is input to the cumulative addition count storage register 153. The omitting bit number 115 is input to the omitting bit number storage register 154. One input data storage register output 158 of the input data storage register 151 is input to the input data MSB acquisition unit 155.

The weight parameter storage register output 159 of the weight parameter storage register 152 is input to the weight parameter MSB acquisition unit 156. One cumulative addition count storage register output 160 of the cumulative addition count storage register 153 and the omitting bit number storage register output 161 of the omitting bit number storage register 154 are input to the threshold value calculation unit 157.

The following data is input to first stop signal generation unit 251.

The input data storage register output 158 of the input data storage register 151

The weight parameter storage register output 159 of the weight parameter storage register 152

The input data MSB acquisition unit output 162 of the input data MSB acquisition unit 155

The weight parameter MSB acquisition unit output 163 of the weight parameter MSB acquisition unit 156

The threshold value bit number 164, which is the output of the threshold value calculation unit 157

The first stop signal generation unit 251 outputs the first stop signal 117 The second signal generation unit 252 receives the first stop signal 117 and outputs the second stop signal 118

Next, the operation of each block (component) of the operation stop signal generation unit 116 will be described with reference to FIG. 7.

When the number of computing units (1)301 is P, P types (pieces) exist for each data, parameter, and signal 104, 113, 158, 159, 162, 163, 256, 257, and 117 in the drawing, and P/2 types (pieces) exist for 118. Note that P types (pieces) and P/2 types (pieces) described as each data can also be respectively counted as a wiring type (number). In the description of the present example, P=4 will be described, but this is not the sole case. That is, the number (type) can be a required numerical value according to the application.

First, four types of data are stored in the input data storage register 151 for each of the input data 104, the weight parameter 113, the cumulative addition count 114, and the omitting bit number 115. Furthermore, four types of data are stored in the weight parameter storage register 152, and one type of data is stored in the cumulative addition count storage register 153 and the omitting bit number storage register 154.

The cumulative addition count storage register 153 validates the flag A165 with the update of the input cumulative addition count 114 as a trigger. In addition, the input data storage register 151 validates the flag B166 with the update of the input data 104 as a trigger.

The input data MSB acquisition unit 155 acquires the bit position I of the MSB for each of the four types of the input data storage register output 158 of the input data storage register 151. Similarly, the weight parameter MSB acquisition unit 156 acquires the bit position W of the MSB for each of the four types of the weight parameter storage register output 159 of the weight parameter storage register 152.

In the threshold value calculation unit 157, a threshold value bit number D for performing the determination to stop the operation is computed from one cumulative addition count storage register output 160 of the cumulative addition count storage register 153 and the omitting bit number storage register output 161 of the omitting bit number storage register 154. The threshold value bit number D is computed by the following (Equation 1).

$$D=c-\log 2(x)-\log 2(n) \qquad \text{(Equation 1)}$$

In (Equation 1), c is a value of 161 which is the omitting bit number described above with reference to FIG. 3, x is a value of 160 which is the cumulative addition count, and n is 2 in the present example.

Specifically, the configuration of the first stop signal generation unit 251 will be described with reference to FIG. 7.

The first stop signal generation unit 251 includes a numerical value comparison unit 253, a threshold value determination unit 254, and a logical sum operation unit 255. The following data are input to first stop signal generation unit 251.

The input data storage register output 158 from the input data storage register 151

The weight parameter storage register output 159 of the weight parameter storage register 152

The input data MSB acquisition unit output 162 of the input data MSB acquisition unit 155

The weight parameter MSB acquisition unit output 163 of the weight parameter MSB acquisition unit 156

The threshold value bit number 164 from the threshold value calculation unit 157

Next, a connection relationship of the first stop signal generation unit 251 will be described with reference to FIG. 7.

The input data storage register output 158 from the input data storage register 151 and the weight parameter storage register output 159 of the weight parameter storage register 152 are input to the numerical value comparison unit 253. The input data MSB acquisition unit output 162 of the input data MSB acquisition unit 155, the weight parameter MSB acquisition unit output 163 of the weight parameter MSB acquisition unit 156, and the threshold value bit number 164 from the threshold value calculation unit 157 are input to the threshold value calculation unit 157. The logical sum operation unit 255 receives the numerical value comparison unit output 256, which is the output of the numerical value comparison unit 253, and the threshold value determination unit output 257 of the threshold value determination unit 254 as inputs, and outputs the first stop signal 117.

Next, the operation of each configuration related to the output of first stop signal 117 will be described.

First, the numerical value comparison unit 253 determines the presence or absence of a value of 0 for the input data storage register output 158 of the four types of data of the input data storage register 151 and the weight parameter storage register output 159 of the four types of data of the weight parameter storage register. As a result, when 0 is present in any of the total of eight types of data, the stop signal corresponding to the respective data is made valid. Then, the threshold value determination unit 254 performs a numerical value comparison based on (Equation 2) from the four types of I described above, the four types of W described above, and the D described above (the threshold value bit number 164), and validates the threshold value determination unit output 257 when (Equation 2) is true.

$$I+W<D \qquad \text{(Equation 2)}$$

Next, the logical sum operation unit 255 computes a logical sum of the four types of numerical value comparison unit outputs 256 from the numerical value comparison unit 253 and the four types of threshold value determination unit outputs 257 from the threshold value determination unit 254. As a result, the logical sum operation unit 255 determines which of the four types of computing units (1)301 to be stopped is to be stopped, and validates (outputs) the first stop signal 117 according to the result.

The second stop signal generation unit 252 validates (outputs) the corresponding second stop signal when the respective signals are all valid in the plurality of groups of the first stop signals 117.

Figure 8:
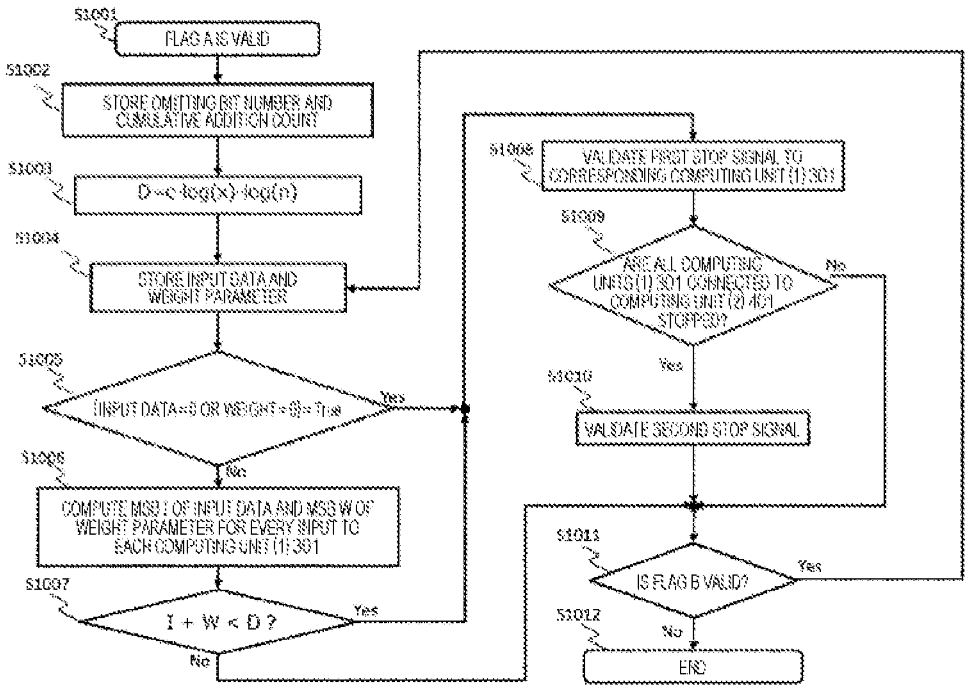
FIG. 8 is a flowchart showing processes of the operation stop determination unit 116 that operates in parallel with a convolution operation in the first example.

Next, the operation in the j-th operation stop signal generation unit 116 will be described with reference to a flowchart illustrated in FIG. 8.

When the storage flag A165 of the cumulative addition count is validated, the operation stop signal generation unit 116 starts the operation (step S1001).

Next, the operation stop signal generation unit 116 stores the omitting bit number 115 in the omitting bit number storage register 154, and stores the cumulative addition count 114 in the cumulative addition count storage register 153 (step S1002).

Next, the threshold value calculation unit 157 of the operation stop signal generation unit 116 calculates (Equation 1) described above (step S1003).

Next, the operation stop signal generation unit 116 stores the four types of input data 104 in the input data storage register 151, and stores the four types of weight parameters 113 in the weight parameter storage register 152 (step 31004).

Next, the numerical value comparison unit 253 of the operation stop signal generation unit 116 determines the presence or absence of a value of 0 for the input data storage register output 158 of the input data storage register 151 and the weight parameter storage register output 159 of the weight parameter storage register 152. As a result, in a case where any of them has a value of 0, the process proceeds to step S1008 (step S1005: Yes). In a case where both are not 0, the process proceeds to S1006 (step S1005: No).

This process (step S1005) is executed for each of the four types which are combinations of input data and weight parameters input to the computing unit (1)301.

Next, the input data MSB acquisition unit 155 of the operation stop signal generation unit 116 computes (specifies) the respective MSB I for the four types of input data, which are the input data 104. Furthermore, the weight parameter MSB acquisition unit 156 of the operation stop signal generation unit 116 computes (specifies) the respective MSB W for the four types of weight parameter, which are the weight parameter 113 (step S1006).

Next, the numerical value comparison unit 253 of the operation stop signal generation unit 116 calculates the above-described (Equation 2) using D calculated in step S1003, I of the MSB of the input data, and W of the MSB of the weight parameter. When (Equation 2) is true, the process proceeds to step S1008 (step S1007: Yes). When (Equation 2) is false, the process proceeds to step S1011 (step S1007: No). This process (step) is executed for each of the four types, which are the combinations of input data and weight parameters input to the computing unit (1)301.

Next, the first stop signal generation unit 251 of the operation stop signal generation unit 116 validates the first stop signal 117 to the computing unit (1)302 corresponding to the four types of combinations of the input data 104 and the weight parameter 113 (step S1008). That is, according to the result of the logical sum operation unit 255, the first stop signal 117 is output to the corresponding computing unit (1)301.

When the second stop signal generation unit 252 groups first stop signals 117 into a plurality of groups, and when the respective signals are all valid (all computing units (1)301 are stopped), the process proceeds to step S1010 (step S1009: Yes). When one or more of them are invalid (at least one computing unit (1)301 is not stopped), the process proceeds to step S1011 (step S1009: No). This process (step) is executed for each of the two sets which are combinations of the first stop signals.

Next, the second stop signal generation unit 252 transmits, to the computing unit (2)401, the second stop signal 118 for the corresponding computing unit (2) (step S1010).

Next, the operation stop signal generation unit 116 determines whether the input data update flag B166 is valid. As a result, if the flag is valid, the process returns to step S1004 (step S1011: Yes). Furthermore, when the input data update flag B166 is invalid, the process proceeds to step S1012 (step S1011: No). Then, in a case where the input data update flag B166 is invalid, determination is made that the j-th process (process of the operation stop signal generation unit 116) ends (step S1012).

This is the end of the description of the first example.

Second Example

Next, a second example will be described. In the second example, an external environment recognition device 1000 that stops each computing unit (1) and (2) by blocking the clock signal will be described. The same reference numerals are given to the same parts as those of the first example in the drawings, and the description thereof will be omitted. Note that, in the present example, the recognition device 1000 will be described as an example, but a computing device that performs operation not limited to recognition is also included in the scope of the present example.

Figure 9:
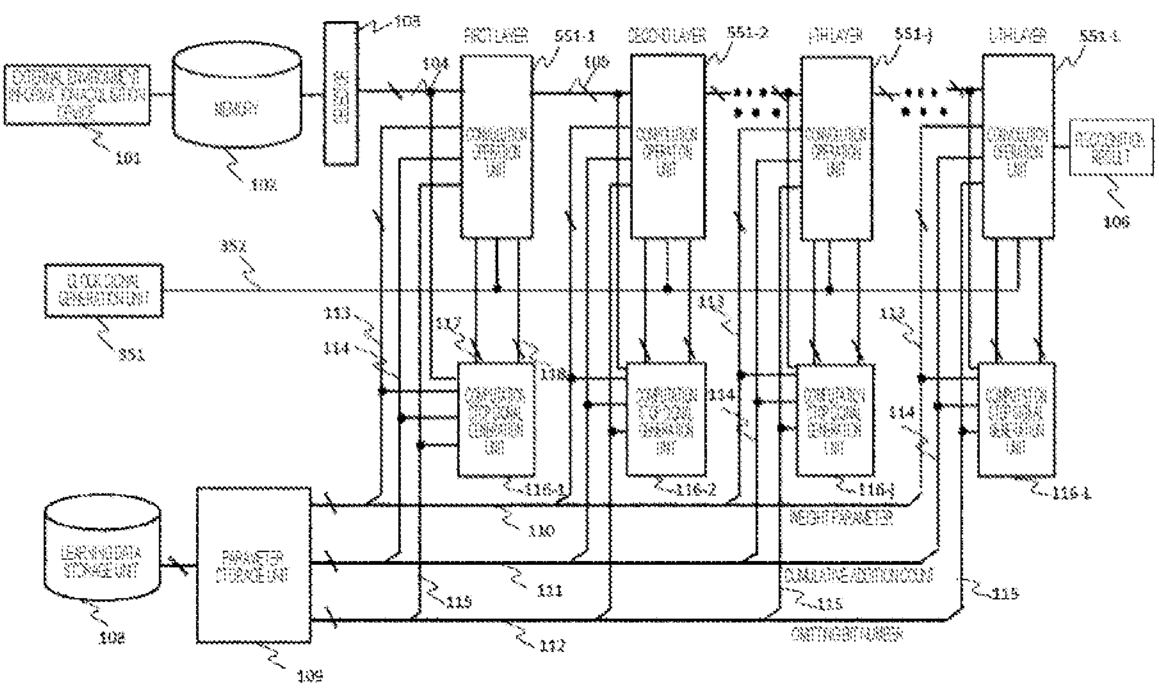
FIG. 9 is a configuration diagram of a recognition device 1000 according to a second example.

FIG. 9 is a configuration diagram of a recognition device 1000 according to the second example using a clock signal. Here, a difference between the configuration of FIG. 9 and FIG. 1 will be described. In FIG. 9, a clock signal generation unit 351 and a convolution operation unit 551 that receives clock supply are added to the configuration illustrated in FIG. 1 of the first example. Furthermore, the convolution operation units 551-1 to L; are different from the convolution operation units 107-1 to L of the first example in that clock signals are used. This point will be described below with reference to FIG. 10.

Figure 10:
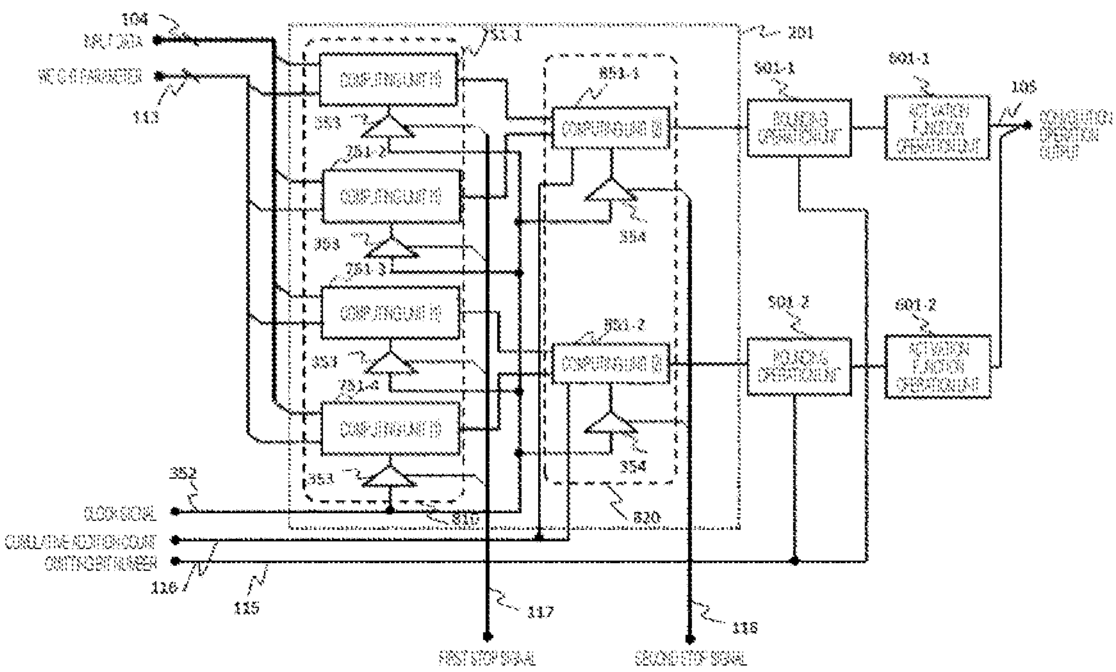
FIG. 10 is a diagram illustrating an internal configuration of a convolution operation unit 551 in the second example.

FIG. 10 is an explanatory diagram illustrating a configuration of the convolution operation units 551-1 to L that receive the clock supply in FIG. 9.

The first operation unit 810 (broken line portion in FIG. 10) of the convolution operation unit 551 is different from the first operation unit 801 of the first example in that a clock buffer 353 with a switch function connected to the computing unit (1)751 is added. Furthermore, the second operation unit 820 (broken line portion in FIG. 10) is different from the second operation unit of the first example in that a clock buffer 354 with a switch function connected to the computing unit (2)851 is added.

Next, a connection relationship of each configuration in the convolution operation units 551-1 to L in the present example will be described with reference to FIG. 10.

A clock signal 352 and the first stop signal 117 are input to the clock buffer 353 with a switch function connected to the computing unit (1)751. The clock signal 352 and the second stop signal 118 are input to the clock buffer 354 with a switch function connected to the computing unit (2)851.

A clock which is an output from the clock buffer 353 with a switch function is input to the computing unit (1)751. A clock which is an output from the clock buffer 354 with a switch function is input to the computing unit (2)851.

Next, the operation of each component of the convolution operation unit 551 will be described with reference to FIG. 10.

The computing unit (1)751 and the computing unit (2)851 operate according to the clock signal 352. That is, each of the computing units (1)751-1 to 4 and each of the computing units (2)851-1, 2 operate when the clock signal 352 is being input. In addition, the clock buffer 353 with a switch function connected to the computing unit (1)751 stops clock supply to the computing unit (1)751 when the first stop signal 117 is input. The operation of the computing unit (1)751 is thereby stopped.

The clock buffer 354 with a switch function connected to the computing unit (2)851 stops clock supply to the computing unit (2)851 when the second stop signal 118 is input. The operation of the computing unit (2)851 is thereby stopped.

Figure 11:
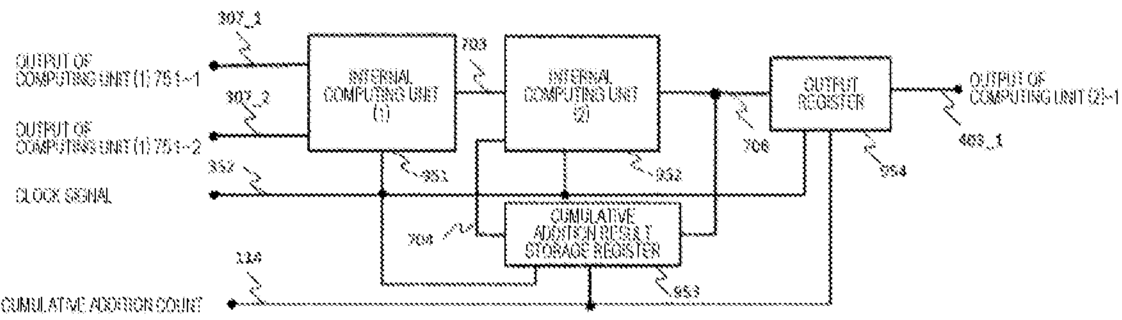
FIG. 11 is a diagram illustrating an internal configuration of a computing unit (2)851 in the second example.

Next, the computing unit (2)851 that receives the supply of clock will be described with reference to FIG. 11. Next, the computing unit (2)851 that receives the clock supply will be described with reference to FIG. 11. The computing unit (2)851 receiving the clock supply also receives a clock signal 352 as an input. Other configurations (functions) are similar to those described with reference to FIG. 3.

Next, a connection relationship of the computing unit (2)851 will be described with reference to FIG. 11. It is connected to an internal computing unit (1)951, an internal computing unit (2)952, a cumulative addition result storage register 953 and an output register 954. Then, a clock signal 352 is input to each of them to control the operation. That is, in FIG. 11, the operation and stop of the computing unit are performed depending on the presence or absence of the clock signal. More specifically, when the first stop signal and the second stop signal are validated (output) in steps S1008 and S1010 of FIG. 8, these operations are stopped. Here, when the first stop signal and the second stop signal are validated (output), the clock signal is stopped by the clock buffer 353 with a switch function and the clock buffer 354 with a switch function. The operation of the computing unit (1)751 and the computing unit (2)851 is thereby stopped. Since the validation (output) of the first stop signal and the second stop signal is similar to that in the first embodiment, the description thereof will be omitted. This is the end of the description of the second example.

Figure 12:
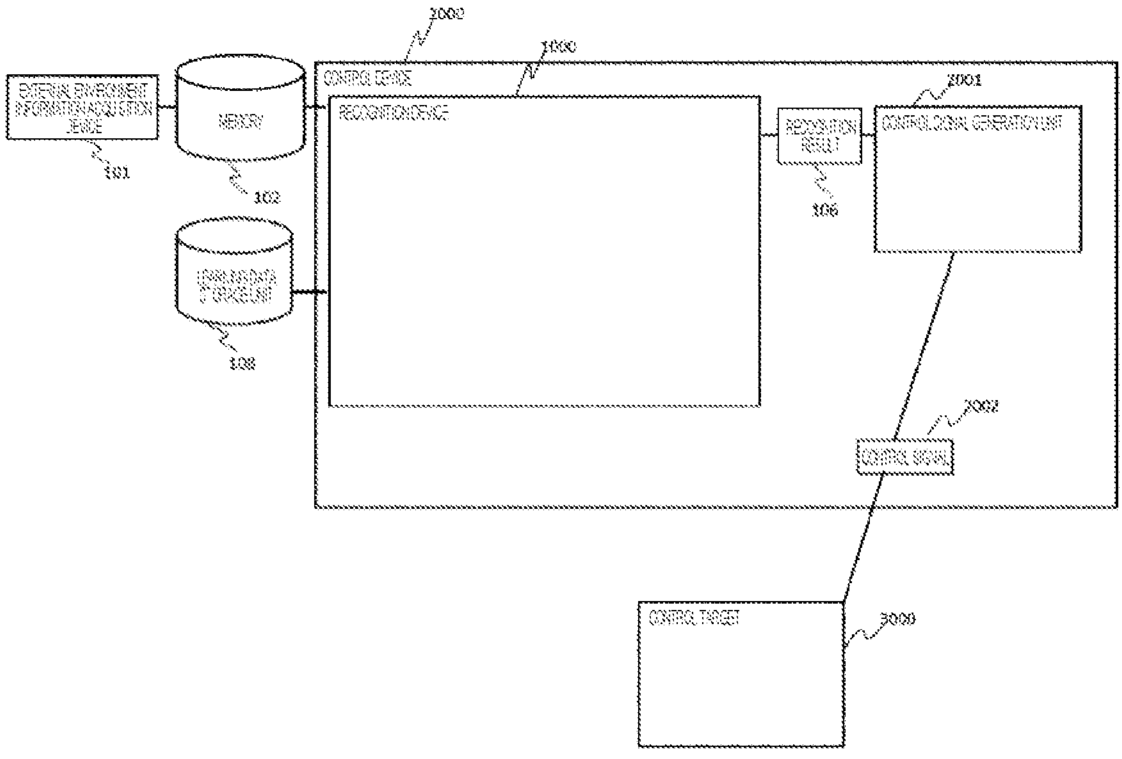
FIG. 12 is a diagram illustrating an example in which the first and second examples are applied to a control device.

In each example, the recognition device 1000 has been described as an example, but a computing device that performs operation not limited to recognition is also included in the scope of each example. Furthermore, the control device 2000 illustrated in FIG. 12 is also included in the application example of each example. That is, the recognition result output from the recognition device 1000 is transmitted to the control signal generation unit 2001. The control signal generation unit 2001 generates a control signal 2002 in accordance with the recognition result, and controls the control target 3000 based on the control signal. The control target 3000 includes, for example, a vehicle. In this case, automatic driving and driving support of the vehicle can be realized by each example. Furthermore, in this case, a so-called electronic control unit or engine control unit (ECU) is included as the control device 2000.

According to each of the above examples, when operation is performed using general image data, a ratio of 0 in operation data of a convolution operation is about 60% due to the rounding process and sparsity. The power consumption reduction effect can be expected to be about 20% when the stop function for each layer according to each example is used.

REFERENCE SIGNS LIST

101 external environment information acquisition device
102 memory
103 selector
104 input data
105 convolution operation output
106 recognition result
107 convolution operation unit
108 learning data storage unit
109 parameter storage unit
110 weight parameter of plurality of layers
111 cumulative addition count of plurality of layers
112 omitting bit number of plurality of layers
113 weight parameter for one layer
114 cumulative addition count for one layer
115 omitting bit number for one layer
116 operation stop signal generation unit
117 first stop signal
118 second stop signal
201 numerical value operation unit
301 computing unit (1)
305 individual input data
306 individual weight parameter
307 output of computing unit (1)
401 computing unit (2)
403 output of computing unit (2)
501 rounding operation unit
503 output of rounding operation unit
601 activation function operation unit
701 internal computing unit (1)
702 internal computing unit (2)
703 output of internal computing unit (1)
704 output of cumulative addition result storage register
705 cumulative addition result storage register
706 output of internal computing unit (2)
707 output register
801 first operation unit
802 second operation unit
803 stop signal of computing unit (1)
901 stop signal of computing unit (2)
151 input data storage register
152 weight parameter storage register
153 cumulative addition count storage register
154 omitting bit number storage register
155 input data MSB acquisition unit
156 weight parameter MSB acquisition unit
157 threshold value calculation unit
158 input data storage register output
159 weight parameter storage register output
160 cumulative addition count storage register output
161 omitting bit number storage register output
162 input data MSB acquisition unit output
163 weight parameter MSB acquisition unit output
164 threshold value bit number
165 cumulative addition count update flag
166 input data update flag
251 first stop signal generation unit
252 second stop signal generation unit

253 numerical value comparison unit
254 threshold value determination unit
255 logical sum operation unit
256 numerical value comparison unit output
257 threshold value determination unit output
351 clock signal generation unit
352 clock signal
353 clock buffer
354 clock buffer
450 rounding data input register
451 output of rounding data input register
452 bit selector
453 bit selector output
454 rounding data output register
551 convolution operation unit
751 computing unit (1) receiving clock supply
851 computing unit (2) receiving clock supply
951 internal computing unit (1) receiving clock supply
952 internal computing unit (2) receiving clock supply
953 cumulative addition result storage register receiving clock supply
954 output register receiving clock supply

The invention claimed is:

1. A computing device that performs a predetermined operation comprising:

a numerical value operation unit including a first computing unit that performs a predetermined operation based on input data, and a second computing unit that performs a predetermined operation using an operation result from the first computing unit, and a third computing unit that performs a predetermined operation based on the input data, the third computing unit being connected in parallel with the first computing unit;

a rounding operation unit that performs a rounding operation on an output of the numerical value operation unit;

a parameter storage unit that stores a number of bits omitted by the rounding operation in the rounding operation unit; and an operation stop signal generation unit that independently executes a determination on whether respective operations on the first computing unit and the third computing unit need to be stopped, based on the input data and the number of bits omitted, determines whether operation of the second computing unit needs to be stopped based on a result of the determination for the first computing unit and the third computing unit, and outputs one or more stop signals according to a result of the determination.

2. The computing device according to claim 1, wherein the operation stop signal generation unit determines whether the operation on the first computing unit needs to be stopped, using the input data and the number of bits omitted, and determines whether the operation on the second computing unit needs to be stopped according to the result of the determination.

3. The computing device according to claim 2, wherein when it is determined that the operation on the first computing unit needs to be stopped, the operation stop signal generation unit determines whether the operation on the second computing unit needs to be stopped.

4. The computing device according to claim 3, wherein when a number of bits of the input data, in a case where the operation result from the first computing unit is rounded by the rounding operation unit, is less than or equal to a predetermined value, the operation stop signal generation unit determines that the operation on the first computing unit needs to be stopped.

5. The computing device according to claim 4, wherein when it is determined that the operation on the first computing unit needs to be stopped and an operation result from the first computing unit is 0, the operation stop signal generation unit determines that the operation on the second computing unit needs to be stopped.

6. The computing device according to claim 5, wherein the input data includes an input pixel and a weight parameter of a neural network;

the first computing unit and the third computing unit each comprise a multiplier that performs multiplication on the input data; and the second computing unit comprises an adder that adds a multiplication result from the multiplier.

7. The computing device according to claim 6, wherein when a most significant bit (MSB) of the output data of each of the first computing unit and the third computing unit is less than or equal to the number of bits omitted, the operation stop signal generation unit determines that the respective operations on the first computing unit and the third computing unit need to be stopped.

8. The computing device according to claim 6, wherein the operation stop signal generation unit determines whether the operations need to be stopped using a most significant bit (MSB) of the input pixel and the MSB of the weight parameter, and determines that respective operations on the first computing unit and the third computing unit need to be stopped when a sum of a value of a bit position of the MSB of the input pixel and a value of a bit position of the MSB of the weight parameter is smaller than the number of bits omitted.

9. The computing device according to claim 8, further comprising:

a clock signal stopping unit that supplies a clock signal generated by a clock signal generation unit, the clock signal generation unit supplying a clock signal to the first computing unit, the second computing unit, and the third computing unit, and wherein the clock signal stopping unit stops supply of a clock signal to the first computing unit, the second computing unit, and the third computing unit based on the one or more stop signals output from the operation stop signal generation unit.

10. A recognition device, wherein according to the computing device according to claim 1, external environment information acquired from an external environment acquisition device is used as the input data, and situation of an external environment is recognized using the external environment information.

11. A control device comprising a recognition device according to claim 10, wherein result of the predetermined operation is output as a control signal for a target according to the recognized situation of the external environment.

12. The computing device according to claim 8, wherein the operation stop signal generation unit determines a threshold value based on:

the number of bits omitted, and a cumulative addition count associated with the second computing unit, and determines whether the respective operations need to be stopped based on the threshold value.

* * * * *